Patented Oct. 26, 1926.

1,604,169

UNITED STATES PATENT OFFICE.

HUGH W. JOHNSTON AND MEADE P. MILLER, OF HOUSTON, TEXAS.

COMPOSITION OF MATTER.

No Drawing.   Application filed May 31, 1924.   Serial No. 717,164.

This invention relates to new and useful improvements in a composition of matter for forming artificial stone; the invention also comprehends the process by means of which the product above designated is produced.

The invention has for its object the production of artificial marble, stone, tile or veneering.

The ingredients are Portland cement, flower of sulphur, talc powder, and a coloring in the form of dry powder, the above ingredients being thoroughly mixed and sifted. This constitutes the dry mixture. The composition also includes calcium chloride made into the form of a brine having a specific gravity of 17, at a temperature of 70 degrees F. Iron oxide and alum water are added to this brine. This liquid is used to reduce the dry mixture to a paste.

The above mentioned ingredients are combined in the proportions and manner stated, as follows:—

To each one hundred (100) pounds of cement there is added one (1) and one-half (½) pounds of flower of sulphur, and one (1) pound of talc powder, and the required amount of coloring matter in the form of a dry powder. These ingredients are mixed thoroughly in their dry state. When this mixture is to be used it is mingled with a brine formed of calcium chloride brought to a specific gravity of 17, at a temperature of 70 degrees F., to which is added one-fourth (¼) ounce of iron oxide, and one-half (½) pint of alum water for each gallon of the calcium brine. This alum water is obtained by dissolving three-fourths (¾) of a pound of alum in one (1) gallon of water. The liquid mixture thus obtained is mixed with the dry mixture above defined until it is reduced into a plastic mass. The liquid solution dissolves the cement to a fine grainless paste, so that when the natural chemical action of the cement takes place, there are no air bubbles in the cement to cause shrinkage. The liquid solution above described causes the cement to become a uniform plastic mass in proper condition to receive any color which it may be desired to incorporate into the mixture, and we have incorporated into the mixture certain ingredients, particularly flower of sulphur and alum to hold firmly the colors as a part of the body of the mixture, so that when used for outside work, and subjected to the weather the colors will be retained.

The mixture may be colored to imitate marble, stone, or tile, and can be used for veneering concrete work.

What we claim is:—

The method herein described of forming artificial stone which consists in mixing Portland cement, flower of sulphur and talc powder together forming a dry mixture, then forming a mixture of calcium chloride, iron oxide and alum water combined in the proportions substantially as described and finally reducing said dry mixture to plastic state by mingling therewith said liquid mixture, substantially as described.

In testimony whereof we have signed our names to this specification.

HUGH W. JOHNSTON.
MEADE P. MILLER.